United States Patent [19]

Bauer et al.

[11] 4,182,819

[45] Jan. 8, 1980

[54] PROCESS FOR THE MANUFACTURE OF VINYL CHLORIDE COPOLYMERS OF A SMALL AND REGULAR PARTICLE SIZE

[75] Inventors: Johann Bauer, Burghausen; Hans Birke, Marktl; Kurt Fendel, Schildgen; Harald Sulek, Burghausen, all of Fed. Rep. of Germany

[73] Assignee: Wacker-Chemie GmbH, Munich, Fed. Rep. of Germany

[21] Appl. No.: 859,335

[22] Filed: Dec. 12, 1977

Related U.S. Application Data

[63] Continuation-in-part of Ser. No. 651,972, Jan. 23, 1976, abandoned.

[30] Foreign Application Priority Data

Jan. 27, 1975 [DE] Fed. Rep. of Germany ....... 2503154

[51] Int. Cl.$^2$ .................. C08F 2/20; C08F 218/08
[52] U.S. Cl. .................... 526/202; 526/203; 526/237; 526/909; 526/344.2
[58] Field of Search .................. 526/203, 202

[56] References Cited

U.S. PATENT DOCUMENTS

| | | | |
|---|---|---|---|
| 3,444,270 | 5/1969 | Aliberti | 260/878 |
| 3,497,480 | 2/1970 | Bauer | 526/203 |

FOREIGN PATENT DOCUMENTS

| | | | |
|---|---|---|---|
| 991134 | 5/1965 | United Kingdom | 526/344 |
| 1150488 | 4/1969 | United Kingdom | 526/344 |

*Primary Examiner*—C. A. Henderson
*Attorney, Agent, or Firm*—Hammond & Littell

[57] ABSTRACT

A process for the manufacture of vinyl chloride copolymers soluble in lacquer solvents with a clear solution consisting of copolymerizing vinyl chloride and at least one other olefinically-unsaturated compound copolymerizable with vinyl chloride under suspension copolymerization conditions in an aqueous dispersion and in the presence of (a) a monomer-soluble polymerization catalyst, (b) a water-soluble salt of a maleic acid anhydride mixed polymerizate of maleic acid anhydride, an olefinically unsaturated ester or ether of at least 7 carbon atoms, and another vinyl monomer, (c) from 0.003% to 0.007% by weight of a polyvinyl alcohol having a low viscosity and a high saponification number and (d) from 0.03% to 0.05% by weight of sodium chloride, whereby a vinyl chloride copolymer is obtained having the majority of its particles of a size between 0.1 and 0.5 mm.

17 Claims, No Drawings

PROCESS FOR THE MANUFACTURE OF VINYL CHLORIDE COPOLYMERS OF A SMALL AND REGULAR PARTICLE SIZE

REFERENCE TO PRIOR APPLICATIONS

This application is a continuation-in-part of patent application Ser. No. 651,972, filed Jan. 23, 1976, and now abandoned.

RELATED ART

The present invention represents an improvement in and modification of the polymerization process described in British Pat. No. 1,162,574 and German Pat. No. 1,645,670.

British Patent Specification No. 1,162,574 relates to a process for the manufacture of vinyl chloride copolymers, which yield clear solutions in lacquer solvents, by suspension polymerization of a mixture comprising vinyl chloride and at least one other olefinically unsaturated compound copolymerizable therewith in aqueous dispersion with the use of monomer-soluble catalysts, wherein there is used as protective colloid a water-soluble salt of a mixed polymerizate made from (1) maleic acid or maleic acid anhydride, (2) a compound of the general formula $$CH_2=CH-X-C_nH_{2n+1},$$

in which X represents an ether oxygen atom or a radical of the formula $$-O-\underset{\underset{O}{\|}}{C}-$$

or $$-\underset{\underset{O}{\|}}{C}-O-$$

and n represents a positive integer not less than 4, and (3) a compound of the general formula $$CH_2=CHR,$$

in which R represents a phenyl radical or a radical of the general formula $$-OC_mH_{2m+1}$$

or $$-O-\underset{\underset{O}{\|}}{C}-C_mH_{2m+1},$$

in which m represents 1, 2 or 3.

While the products of such a process will dissolve in lacquer solvents to give a clear solution and have mainly a fine particle size, it has been found that, when the process is carried out in large production autoclaves, the particle size distribution of the product tends to be too broad. That is to say, that the product tends to contain too large a proportion of large particles (those having a size greater than 0.5 mm) and too large a proportion of fine particles (those having a size less than 0.1 mm). Desirably, the product should consist largely of particles having a size between 0.1 mm and 0.5 mm, since otherwise either the flowability of the product is not adequate or there is too great a production of dust, during transport, when incorporating additives, when drying the product, and when dissolving the product in, for example, lacquer solvents.

It has been found that the incorporation of sodium chloride in the polymerization suspension, according to German Democratic Republic Patent Specification No. 37 184, issued Mar. 5, 1965, results in products having very few or no large particles, that is, over 0.5 mm. The products, however, have a generally reduced particle size, and thus contain an increased proportion of fine particles.

OBJECTS OF THE INVENTION

An object of the present invention is the development of a vinyl chloride copolymer which is soluble in lacquer solvents and gives a clear solution and has the majority of its particles in the range of between 0.1 and 0.5 mm, preferably >0.1 to <0.5 mm. p Another object of the present invention is the development of a process for the manufacture of a vinyl chloride copolymer soluble in lacquer solvents with a clear solution consisting of copolymerizing a monomer mixture of from 50% to 95% by weight of vinyl chloride and from 5% to 50% by weight of at least one olefinically-unsaturated compound copolymerizable with vinyl chloride under suspension polymerization conditions in an aqueous dispersion and in the presence of (a) a monomer-soluble polymerization catalyst, (b) a water-soluble salt of a maleic acid anhydride polymerizate of from 30 to 60 mol percent of (1) maleic acid anhydride, (2) from 1 to 25 mol percent of an unsaturated compound having the formula $$CH_2=CH-X-C_nH_{2n+1}$$

wherein X represents a member selected from the group consisting of —O—, $$-O-\underset{\underset{O}{\|}}{C}-, \text{ and } -\underset{\underset{O}{\|}}{C}-O-,$$

and n represents an integer of from 4 to 28, and (3) the remainder to 100 mol percent of a vinyl compound having the formula $$CH_2=CH-R$$

wherein R represents a member selected from the group consisting of phenyl, —O—$C_mH_{2m+1}$, and $$-O-\underset{\underset{O}{\|}}{C}-C_mH_{2m+1},$$

wherein m is an integer from 1 to 3 (c) from 0.003% to 0.007% by weight, based on the weight of the monomers, of a polyvinyl alcohol having a viscosity of from 3 to 10cP, determined in a 4% aqueous solution at 20° C., and a saponification number of 240 to 320, and (d) from 0.03% to 0.05% by weight, based on the weight of the monomers, of sodium chloride, and recovering said vinyl chloride copolymer having the majority of its particles of a size between 0.1 and 0.5 mm.

These and other objects of the invention will become more apparent as the description thereof proceeds.

DESCRIPTION OF THE INVENTION

The present invention provides a process for the manufacture of a vinyl chloride copolymer by suspension polymerization, which comprises copolymerizing vinyl chloride and at least one other olefinically-unsaturated compound copolymerizable therewith, in an aqueous dispersion and in the presence of (a) a monomer-soluble polymerization catalyst, (b) a water-soluble salt of a maleic acid anhydride copolymer of (1) maleic acid anhydride, (2) a compound of the general formula

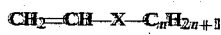

in which X denotes an oxygen atom or a radical of the formula

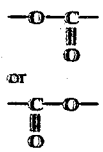

and n denotes an integer of not less than 4, and (3) a compound of the general formula $$CH_2=CHR$$

in which R denotes a phenyl radical or a radical of the formula

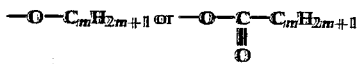

in which m denotes 1, 2 or 3, (c) from 0.003% to 0.007% by weight, based on the weight of the monomers, of a polyvinyl alcohol having a low viscosity and a high saponification number, and (d) from 0.03% to 0.05% by weight, based on the weight of the monomers, of sodium chloride.

More particularly, the present invention relates to a process for the manufacture of a vinyl chloride copolymer soluble in lacquer solvents with a clear solution consisting of copolymerizing a monomer mixture of from 50% to 95% by weight of vinyl chloride and from 5% to 50% by weight of at least one olefinically-unsaturated compound copolymerizable with vinyl chloride under suspension polymerization conditions in an aqueous dispersion and in the presence of (a) a monomer-soluble polymerization catalyst, (b) a water-soluble salt of a maleic acid anhydride polymerizate of from 30 to 60 mol percent of (1) maleic acid anhydride, (2) from 1 to 25 mol percent of an unsaturated compound having the formula

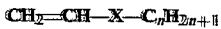

wherein X represents a member selected from the group consisting of —O—,

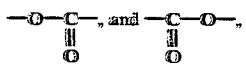

and n represents an integer of from 4 to 28, and (3) the remainder to 100 mol percent of a vinyl compound having the formula

wherein R represents a member selected from the group consisting of phenyl,

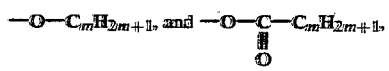

wherein m is an integer from 1 to 3 (c) from 0.003% to 0.007% by weight, based on the weight of the monomers, of a polyvinyl alcohol having a viscosity of from 3 to 10 cP, determined in a 4% aqueous solution at 20° C., and a saponification number of 240 to 320, and (d) from 0.03% to 0.05% by weight, based on the weight of the monomers, of sodium chloride, and recovering said vinyl chloride copolymer having the majority of its particles of a size between 0.1 and 0.5 mm.

In essence, the present invention is an improvement in the process for the manufacture of a vinyl chloride copolymer soluble in lacquer solvents with a clear solution comprising copolymerizing a monomer mixture of vinyl chloride and at least one olefinically-unsaturated compound copolymerizable with vinyl chloride under suspension polymerization conditions in an aqueous dispersion in the presence of a monomer-soluble polymerization catalyst and a water-soluble salt of a maleic acid anhydride polymerizate of (1) maleic acid anhydride, (2) an unsaturated compound having the formula

wherein X represents a member selected from the group consisting of

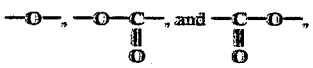

and n represents an integer of at least 4, and (3) a vinyl compound having the formula

wherein R represents a member selected from the group consisting of phenyl, $-O-C_mH_{2m+1}$, and

wherein m is an integer from 1 to 3, as a protective colloid, and recovering said vinyl chloride copolymer, the improvement consisting essentially of conducting said copolymerizing step in the further presence of from 0.003% to 0.007% by weight of a polyvinyl alcohol having a viscosity of from 3 to 10 cP determined in a 4% aqueous solution at 20° C., and a saponification number of 240 to 320, and from 0.03% to 0.05% by weight, based on the weight of monomers, of sodium chloride.

It was surprisingly found that the addition of from 0.003% to 0.007% by weight, based on the weight of monomers, of a polyvinyl alcohol having a low viscosity and a high saponification number results in the formation of a product having a considerably reduced proportion of fine particles without an appreciably increased proportion of large particles.

The proportions of polyvinyl alcohol used in the present process are much less than those used when polyvinyl alcohol is being used as a protective colloid. Advantageously, the amount of polyvinyl alcohol used in the present process is from 0.005% to 0.006% by weight.

The polyvinyl alcohol advantageously has a viscosity of from 3 to 10 cP, preferably of about 5 cP, calculated in a 4% aqueous solution at 20° C. It advantageously has a saponification number of from 240 to 320, preferably of from 240 to 270, calculated as mg KOH/1 gm polyvinyl alcohol.

The general polymerization conditions are those as specified in British Pat. No. 1,162,574.

In general, the monomer mixture, being copolymerized, is a mixture of from 50% to 90% by weight of vinyl chloride and from 10% to 50% by weight of at least one olefinically-unsaturated compound copolymerizable with vinyl chloride. Such olefinically-unsaturated compounds are, for example, vinyl halides other than vinyl chloride; vinyl esters of aliphatic and cycloaliphatic monocarboxylic acids, preferably vinyl lower alkanoates, such as vinyl acetate, and vinyl cyclohexane carboxylate; alkyl esters of olefinically unsaturated monocarboxylic acids, preferably lower alkyl lower alkenoates such as methyl acrylate and methyl methacrylate; monoalkyl and dialkyl esters of olefinically-unsaturated dicarboxylic acids, preferably lower alkyl and dilower alkyl esters of alkenedioic acids having from 4 to 7 carbon atoms, such as monobutyl maleate and diethyl fumarate; and vinyl ethers, preferably vinyl-lower alkyl ethers such as methyl-vinyl ether. In the mixture of monomers, more than one olefinically-unsaturated compound copolymerizable with vinyl chloride may be employed. Preferably the olefinically-unsaturated compound copolymerizable with vinyl chloride is vinyl acetate, possibly in admixture with from 5 to 15% by weight of vinyl acetate, of maleic acid anhydride.

The monomer soluble polymerization catalysts employed are those customarily utilized in suspension polymerizations of vinyl chloride. Optionally, in addition, water-soluble catalysts such as hydrogen peroxide and potassium persulfate can be employed. The polymerization catalysts are employed in the customary amounts for suspension polymerization of vinyl chloride. These amounts are in general from 0.00005% to 3% by weight, preferably from 0.001% to 0.3% by weight based on the weight of the monomers.

The amount of water with reference to the polymerizable monomers is not critical. In general, the proportion of the polymerizable monomers is from 10% to 60%, especially 20% to 40%, by weight of the weight of water and monomers.

The details given in British Specification No. 1,162,574, regarding the protective colloid, that is the water-soluble salts of the maleic acid anhydride copolymer, are also applicable to the present process except that in the present process component (1) may not be maleic acid. Preferably this maleic acid anhydride mixed polymer contains from 30 to 60 mol percent, especially 45 to 55 mol percent of component (1), maleic acid anhydride; from 1 to 25 mol percent, especially 5 to 15 mol percent of component (2), a compound of the formula $$CH_2=CH-X-C_nH_{2n+1}$$ 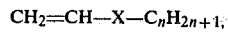

wherein X and n have the fore-given values, and 100-A mol percent, where A is the sum of the components (1) and (2) in mol percent, of component (3), a compound of the formula $$CH_2=CH-R$$ 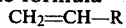

wherein R has the fore-given values. It is preferable that the mol percent of component (2) does not exceed the mol percent of component (3) in the mixed polymerizate. The $C_nH_{2n+1}$ and $C_mH_{2m+1}$ radicals can be either straight chained or branched chained. Preferably n has no higher value than 28.

The water-soluble salts of the maleic acid anhydride mixed polymerizate are preferably the alkali metal salts, especially the sodium salt, and the ammonium salt. Especially preferred is the compound of the ammonium salt. The amount of protective colloid employed in the polymerization mixture is from 0.1% to 0.3% by weight, based on the weight of the monomers.

The entire amount of the polymerizable mixture of vinyl chloride and other olefinically-unsaturated compounds copolymerizable therewith can be charged at the commencement of the polymerization. However, the monomers can also be partially or completely dosed into the polymerization mixture during the course of the polymerization. The pH value of the polymerization reaction is preferably from 4 to 7. The polymerization temperature is that customarily employed for the suspension polymerization of vinyl chlorides, that is, from 0° C. to 160° C., especially from about 30° C. to 80° C.

The polymerizations are conducted in apparatus usually employed for the suspension polymerization of vinyl chloride such as enamelled or special alloy steel plated autoclaves after preparation of the dispersion of the monomers in the aqueous medium.

The vinyl chloride copolymers manufactured by the present process have similar solubility properties to those manufactured by the process of British Specification No. 1,162,574, and their solutions can be used for similar purposes.

EXAMPLES

The following examples illustrate the present invention. The protective colloid used in each example was Eballoid—a copolymer of maleic acid anhydride, vinyl acetate, and 37 Versatic" ® acid, vinyl ester in a weight ratio of 49:33:18 respectively ("Versatic" is a Trade Mark). The "Versatic" acids employed as the vinyl ester the "Versatic" acid 911 and "Versatic" acid 1519. "Versatic" acids have the general formula

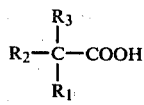

wherein $R_1$ and $R_2$ are each alkyl, aryl or aralkyl and $R_3$ is alkyl, aryl, aralkyl or hydrogen. $R_1$, $R_2$, $R_3$ or two of these together can be in a ring compound. The alkyl groups can be either linear, branched or cyclic. The acids in "Versatic 911" are acids containing from 9 to 11 carbon atoms, whereas "Versatic 1519" contains acids with from 15 to 19 carbon atoms, The polyvinyl alcohol A used in both examples had a viscosity of 5 cP (measured as a 4% aqueous solution at 20° C.) and a saponification number of 270. The polyvinyl alcohol B used in Example 2 had a viscosity of 25 cP and a saponification number of 190. All percentages are by weight.

EXAMPLE 1

6800 liters of water, 5 kg of dilauroyl peroxide and the amounts of protective colloid, sodium chloride and polyvinyl alcohol given in Table 1 were introduced into a special alloy steel-plated autoclave provided with an agitator and having a capacity of 12,000 liters. The air was removed from the autoclave by vacuum and then 2030 kg of vinyl chloride and 1470 kg of vinyl acetate were fed in. The polymerization mixture was heated to 63° C., while being stirred at 60 rev/min, and then polymerized for 10 hours. The pressure in the autoclave was released, and then reduced to 0.1 atmosphere in order to remove unpolymerized monomers. The polymer was filtered off, washed, and dried. The particle size of the dried polymer was analyzed by sieving. The results are given in Table 1 and clearly show that the polymer (c) produced according to the invention has a greater proportion of particles having a size between 0.1 and 0.5 mm than do the polymers (a) and (b) produced by conventional processes.

TABLE 1

| Polymer | Protective Colloid Content (% of monomers) | Sodium Chloride Content (% of monomers) | Polyvinyl Alcohol Content (% of monomers) | Sieve residue (% polymer) on sieves of size (mm) | | | | | | | Proportion of Polymer between 0.1 and 0.5 mm | Porportion of Polymer between >0.1 and <0.5 mm |
|---|---|---|---|---|---|---|---|---|---|---|---|---|
| | | | | 1.0 | 0.5 | 0.3 | 0.25 | 0.15 | 0.1 | <0.1 | | |
| (a) | 0.25 | none | none | 4 | 13 | 7 | 3 | 11 | 12 | 50 | 33 | 21 |
| (b) | 0.18 | 0.04 | none | 0 | 0 | 1 | 1 | 7 | 25 | 66 | 34 | 9 |
| (c) | 0.15 | 0.04 | A 0.006 | 0 | 0 | 44 | 11 | 17 | 11 | 17 | 83 | 72 |

EXAMPLE 2

200 liters of water, 0.1%, based on the monomers, of dilauroyl peroxide, and the amounts of protective colloid, sodium chloride, and polyvinyl alcohol given in Table 2 were introduced into a special alloyed steel-plated autoclave provided with an agitator and having a capacity of 400 liters. The air was removed from the autoclave by vacuum, and then 57 kg of vinyl chloride and 43 kg of vinyl acetate were fed in. The polymerization mixture was then maintained at 60° C. for 9 hours, while being stirred at 90 rev/min. The excess monomers were removed, and the product treated and analyzed, as in Example 1. The results are given in Table 2, from which it may be seen that the polymer (c) produced according to the invention has a greater proportion of particles having a size between 0.1 and 0.5 mm than do the polymers (a) and (b) produced by conventional processes and also than does the polymer (d) produced using a polyvinyl alcohol of high viscosity and low saponification number.

TABLE 2

| Polymer | Protective Colloid Content (% of monomers) | Sodium Chloride Content (% of monomers) | Polyvinyl Alcohol Content (% of monomers) | Sieve residue (% polymer) on sieves of size (mm) | | | | | | Proportion of Polymer between 0.1 and 0.5 mm | Proportion of Polymer between >0.1 and <0.5 mm |
|---|---|---|---|---|---|---|---|---|---|---|---|
| | | | | 0.5 | 0.3 | 0.25 | 0.15 | 0.1 | <0.1 | | |
| (a) | 0.3 | none | none | 22 | 5 | 11 | 22 | 7 | 33 | 45 | 38 |
| (b) | 0.3 | 0.04 | none | 1 | 0.5 | 0.5 | 4 | 40 | 54 | 45 | 5 |
| (c) | 0.3 | 0.04 | A 0.005 | 20 | 10 | 14 | 33 | 20 | 3 | 77 | 57 |
| (d) | 0.3 | 0.04 | B 0.005 | 35 | 10 | 3 | 14 | 13 | 25 | 40 | 27 |

The preceding specific embodiments are illustrative of the practice of the invention. It is to be understood, however, that other expedients known to those skilled in the art, or disclosed herein, may be employed without departing from the spirit of the invention or the scope of the appended claims.

We claim:

1. A process for the manufacture of a vinyl chloride copolymer soluble in lacquer solvents with a clear solution consisting of copolymerizing a monomer mixture of from 50% to 95% by weight of vinyl chloride and from 5% to 50% by weight of at least one olefinically-unsaturated compound copolymerizable with vinyl chloride selected from the group consisting of vinyl acetate and mixtures of vinyl acetate with from 5% to 15% by weight of vinyl acetate of maleic acid anhydride under suspension polymerization conditions in an aqueous dispersion and in the presence of (a) a monomer-soluble polymerization catalyst,
(b) from 0.1% to 0.3% by weight, based on the weight of monomers, of a water-soluble salt of a maleic acid anhydride polymerizate of from 45 to 55 mol percent of
   (1) maleic acid anhydride,
   (2) from 5 to 15 mol percent of an unsaturated compound having the formula

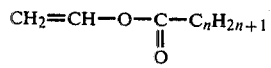

and n represents an integer of from 4 to 28, and
   (3) the remainder to 100 mol percent of a vinyl compound having the formula

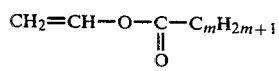

wherein m is an integer from 1 to 3,
(c) from 0.003% to 0.007% by weight, based on the weight of the monomers, of a polyvinyl alcohol having a viscosity of from 3 to 10 cP, determined in a 4% aqueous solution at 20° C., and a saponification number of 240 to 320, and (d) from 0.03% to 0.05% by weight, based on the weight of the monomers of sodium chloride, and recovering said vinyl chloride copolymer having the majority of its particles of a size between 0.1 and 0.5 mm.

2. The process of claim 1 wherein said component (c) is employed in an amount of from 0.005% to 0.006% by weight, based on the weight of the monomers.

3. The process of claim 1 wherein said polyvinyl alcohol of component (c) has a viscosity of 5 cP, determined in a 4% aqueous solution at 20° C.

4. The process of claim 1 wherein said polyvinyl alcohol of component (c) has a saponification number of 240 to 270.

5. The process of claim 1 wherein component (a) is selected from the group consisting of diacetyl peroxide, didecanoyl peroxide, acetylbenzoyl peroxide, dilauroyl peroxide, dibenzoyl peroxide, bis-2,4-dichlorobenzoyl peroxide, di-t-butyl peroxide, diisopropyl percarbonate, t-butyl perpivalate, acetylcyclohexanesulphonyl peroxide, and azobutyric acid dinitrile.

6. The process of claim 1 wherein said vinyl chloride copolymer has the majority of its particles of a size between >0.1 and <0.5 mm.

7. The process of claim 1, wherein, in said maleic acid anhydride polymerizate component (b), component (2) is a vinyl ester of an alkanoic acid containing not less than 5 carbon atoms and which is branched in the $\alpha$-position to the carboxyl group.

8. The process of claim 1, wherein, in said maleic acid anhydride polymerizate component (b), component (2) is a mixture of vinyl esters of alkanoic acids containing not less than 8 carbon atoms and which are branched in the $\alpha$-position to the carboxyl group and are obtainable by reacting monoolefins with carbon monoxide and water in the presence of an acid catalyst.

9. The process of claim 1 wherein said water-soluble salts of component (b) are selected from the group consisting of the alkali metal salts and the ammonium salt.

10. The process of claim 1 wherein said maleic acid anhydride polymerizate component (b) was prepared by free-radical precipitation polymerization using a monomer-soluble catalyst and a solvent that is inert to maleic acid anhydride.

11. The process of claim 1 wherein vinyl chloride is copolymerized with vinyl acetate.

12. A process for the manufacture of a vinyl chloride copolymer soluble in lacquer solvents with a clear solution consisting of copolymerizing a monomer mixture of from 50% to 95% by weight of vinyl chloride and from 5% to 50% by weight of at least one olefinically-unsaturated compound copolymerizable with vinyl chloride selected from the group consisting of vinyl acetate and mixtures of vinyl acetate with from 5% to 15% by weight of vinyl acetate of maleic acid anhydride under suspension polymerization conditions in an aqueous dispersion and in the presence of (a) a monomer-soluble polymerization catalyst,
(b) from 0.1% to 0.3% by weight, based on the weight of the monomers of a water-soluble salt selected from the group consisting of alkali metals and ammonium, of a maleic acid anhydride polymerizate of from 45 to 55 mol percent of (1) maleic acid anhydride,
(2) from 5 to 15 mol percent of an unsaturated compound having the formula

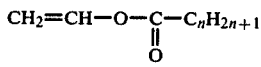

where n represents an integer of from 5 to 28 and the radical

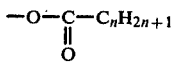

is branched in the $\alpha$-position to the carboyxl group, and (3) the remainder to 100 mol percent of a vinyl compound having the formula

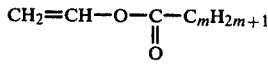

wherein m is an integer from 1 to 3, (c) from 0.005% to 0.006% by weight, based on the weight of the monomers, of a polyvinyl alcohol having a viscosity of from 3 to 10 cP, determined in a 4% aqueous solution at 20° C., and a saponification number of 240 to 270, and (d) from 0.03% to 0.05% by weight, based on the weight of the monomers of sodium chloride, and recovering said vinyl chloride copolymer having the majority of its particles of a size between >0.1 and <0.5 mm.

13. The process of claim 12 wherein said polyvinyl alcohol of component (c) has a viscosity of 5 cP, determined in a 4% aqueous solution at 20° C.

14. The process of claim 12 wherein, in said maleic acid anhydride polymerizate component (b), component (2) is a mixture of vinyl esters of alkanoic acids containing not less than 8 carbon atoms and which are branched in the $\alpha$-position to the carboxyl group and are obtainable by reacting monoolefins with carbon monoxide and water in the presence of an acid catalyst.

15. The process of claim 12 wherein said maleic acid anhydride polymerizate component (b) was prepared by free-radical precipitation polymerization using a monomer-soluble catalyst and a solvent that is inert to maleic acid anhydride.

16. The process of claim 12 wherein vinyl chloride is copolymerized with vinyl acetate.

17. The process of claim 12 wherein component (a) is selected from the group consisting of diacetyl peroxide, didecanoyl peroxide, acetylbenzoyl peroxide, dilauroyl peroxide, dibenzoyl peroxide, bis-2,4-dichlorobenzoyl peroxide, di-t-butyl peroxide, diisopropyl percarbonate, t-butyl perpivalate, acetylcyclohexanesulphonyl peroxide, and azobutyric acid dinitrile.

* * * * *